United States Patent [19]
Van Der Meulen et al.

[11] 3,975,190
[45] Aug. 17, 1976

[54] HYDROMETALLURGICAL TREATMENT OF NICKEL AND COPPER BEARING INTERMEDIATES

[75] Inventors: Sjaak Johan Van Der Meulen; Bauke Weizenbach, both of Fort Saskatchewan; Vladimir N. Mackiw, Islington; Theodore Andrew Kinjerski, Bon Accord, all of Canada

[73] Assignee: Sherritt Gordon Mines Limited, Toronto, Canada

[22] Filed: May 23, 1975

[21] Appl. No.: 580,275

[52] U.S. Cl............................ 75/101 R; 75/103; 75/115; 75/117; 75/118 R; 75/119; 75/99; 75/121; 423/27; 423/32; 423/41; 423/146; 423/150
[51] Int. Cl.² ............... C22B 15/10; C22B 23/04
[58] Field of Search............ 75/101 R, 117, 118, 75/119, 121, 103, 115, 99; 423/27, 32, 41, 150, 146

[56] References Cited
UNITED STATES PATENTS

| | | |
|---|---|---|
| 3,684,489 | 8/1972 | Emicke et al.............. 75/117 X |
| 3,744,994 | 7/1973 | Emicke et al.............. 75/115 X |
| 3,793,432 | 2/1974 | Weston..................... 423/143 |
| 3,798,304 | 3/1974 | Weston..................... 423/36 |
| 3,869,360 | 3/1975 | Kane et al................. 75/101 R |
| 3,909,248 | 9/1975 | Ryan et al................. 75/119 X |

Primary Examiner—G. Ozaki
Attorney, Agent, or Firm—Frank I. Piper; Arne I. Fors; Robert F. Delbridge

[57] ABSTRACT

According to the process described, non-ferrous metal values, particularly nickel, copper and/or cobalt, are extracted from metallurgical intermediates, such as matte and speiss, by reacting the material under oxidizing conditions at a pH of about 4.5 to 6.5 with an ammonia free aqueous solution containing ammonium sulphate, sodium sulphate and/or nickel sulphate. The reaction-products of this operation are then mixed with sulphuric acid under ambient conditions to decrease the pH to about 3–4.5 and to dissolve the non-ferrous metals in the solution which is then separated from the undissolved residue. The process is particularly useful in treating intermediates containing precious metals in that the precious metals are substantially completely recovered in concentrated form in the undissolved residue.

5 Claims, No Drawings

HYDROMETALLURGICAL TREATMENT OF NICKEL AND COPPER BEARING INTERMEDIATES

This invention relates to a hydrometallurgical process for the recovery of non-ferrous metal values from metal-bearing material. The invention is particularly directed to a process in which nickel, cobalt, copper, zinc and the like soluble sulphate forming non-ferrous metals contained in such metal-bearing material as matte, speiss, spent and broken anodes and metallic precipitates and residues are extracted and dissolved in acid sulphate solution and precious metals, if present in the starting material, are recovered in concentrated form in the undissolved residue. The solution can be separated from undissolved residue and the nickel, cobalt and copper content of the solution readily recovered by known procedures. Likewise, the precious metals may be readily recovered from the residue by known methods.

Artificially produced metallurgical intermediates, such as matte, speiss, residues, broken anodes, metallic scrap material and chemical precipitates constitute an important source of non-ferrous metals such as nickel, copper and cobalt. Often such materials also contain significant quantities of precious metals such as gold, platinum, silver and palladium as well as non-ferrous metals. Problems are encountered in the treatment of such materials by conventional pyrometallurgical or hydrometallurgical processes. A major problem is caused by the wide variation in composition of such materials which frequently necessitates different processing schemes for different types of material in order to recover all valuable metal constituents. For example, metallurgical intermediates containing such non-ferrous metals as nickel, cobalt and copper may be leached under oxidizing conditions in basic or acid media to solubilize the valuable metals while, as far as possible, leaving the undesired impurities in the leach residue. However, pressure leaching in basic media, such as aqueous ammoniacal solutions, while very useful in the treatment of relatively simple intermediates containing, for example, only nickel, cobalt, copper, iron and sulphur, has certain disadvantages. For one thing, ammonia-air pressure leaching processes require elaborate pollution abatement equipment such as ammonia scrubbers for spent air cleaning. Also, when applied to materials containing economically significant quantities of precious metals, the precious metals are dissolved by ammoniacal leach solutions along with the nickel, copper and iron values and can only be separated therefrom by difficult and costly procedures. Acidic leaching media, on the other hand, while useful in the treatment of the more complex intermediates, particularly those which contain precious metals, is highly corrosive at the elevated temperatures and pressures generally required for leaching such materials. Leaching must thus be conducted in very costly pressure vessels having acid-resistant linings.

The principal object of the present invention is to provide an economic and efficient hydrometallurgical process which may be utilized for treating a wide variety of metallurgical intermediates which contain non-ferrous metals, including at least one of nickel, copper and cobalt and which may or may not also contain precious metals.

A further object is to provide such a process which operates at a relatively low temperature under mildly acid conditions and therefore requiring relatively low cost material of construction for process equipment.

Another object of this invention is to provide a process in which metallurgical intermediates containing precious metals are treated to extract non-ferrous metal values and dissolve them in solution while the precious metal content remains undissolved and is concentrated in the residue so that separation of the non-ferrous values from the precious metals may be readily accomplished by simple liquid-solid separation procedures.

Still another object of the invention is to provide a process which, compared to ammonia-air pressure leaching, requires little or no pollution abatement equipment.

These and other objects of the invention are accomplished by a process which involves forming a slurry of finely divided particles of non-ferrous metal bearing metallurgical intermediates in a substantially ammonia free aqueous medium containing in solution from about 25 to about 300 grams per liter of at least one sulphate salt selected from the group consisting of ammonium sulphate, sodium sulphate and nickel sulphate devoid of free ammonia; adjusting the pH of the aqueous slurry to within the range of about 4.5 to about 6.5 and reacting said slurry under a positive partial pressure of oxygen with a free oxygen-containing gas at a temperature within the range of about 80°C. to about 180°C.; continuing said reaction to convert any nickel, copper, cobalt and the like soluble-sulphate forming non-ferrous metal values in said material to non-ferrous metal hydroxides; cooling the thus reacted slurry to below 100°C. and reducing the pressure to atmospheric; adding sulphuric acid to the cooled slurry in an amount sufficient to decrease the pH thereof to a value within the range of about 3 to about 4.5 and agitating said acid-treated slurry at atmospheric pressure to dissolve said non-ferrous metal hydroxides in the solution and separating solution containing dissolved non-ferrous metal values from said acid-treated slurry.

The process enables rapid and substantially complete extraction of soluble-sulphate-forming non-ferrous metals such as nickel and copper from the material treated without resort to the strong acidic or ammoniacal conditions employed in the conventional hydrometallurgical processes. This, in turn, enables the process to be conducted with relatively low cost equipment which is incapable of handling highly acidic solutions and, also ensures that any precious metals in the starting material are recovered in concentrated form in the residue.

The metallurgical intermediates amenable to treatment by the process of the present invention are those artificially produced materials which contain values of at least one of the metals nickel, cobalt and copper but which contain insufficient sulphur to combine stoichiometrically with the non-ferrous metals as sulphates. The non-ferrous metals may be in elemental form and/or in the form of sub-sulphides, for example, nickel sub-sulphide ($Ni_3S_2$), copper sub-sulphide ($Cu_2S$) and so on. The material may also contain iron and various other metal and non-metal impurities as well as small but economically significant amounts of precious metals such as gold, silver, palladium, platinum, iridium, ruthenium and rhodium. Typical materials include non-ferrous metals bearing matte, speiss, broken anodes, metallurgical precipitates, sludges and residues and scrap metals.

In order to ensure satisfactory reaction rates and substantially complete extraction of non-ferrous metals, the feed material for the process should be in the form of particles 80% of which are no larger than about 325 mesh standard Tyler screen. Particles larger than this should be comminuted by any convenient means to at least this size.

Should the material be contaminated by water soluble impurities such as halogen salts, particularly chlorides, preferably such impurities should be removed before the material is subjected to the aqueous oxidation operation described below. Normally, this can be accomplished simply by washing the contaminated material with a suitable solvent for the impurity. For example, the halogen salts may be removed by washing the material with hot water containing sufficient alkali to maintain the pH at 9 or higher so that dissolution of nickel, cobalt and/or copper values in the material is suppressed to neglible levels.

The particles, after washing if necessary, are dispersed in a sulphate salt containing solution which is substantially devoid of free ammonia. The preferred sulphate salt for use in the invention is ammonium sulphate although other compatible sulphate salts such as sodium sulphate and nickel sulphate may be used separately or in conjunction with ammonium sulphates.

The preferred range of concentration of sulphate salt in the solution is from about 25 to about 300 grams per liter and, more preferably, the concentration is about 50–100 g.p.l. A solution having a higher concentration of sulphate salt can be used but is less preferred because of the tendency for insoluble nickel salts to form at the lower pH of the subsequent hydroxides dissolution step. The sulphate salt containing solution must be substantially devoid of free ammonia since precious metals in the feed material will be dissolved by ammonia and, instead of being concentrated in the residue, will be lost to the solution. (The term "free ammonia" as used herein means ammonia which is titratable with sulphuric acid).

Preferably, the relative quantities of feed material and sulphate salt containing solution are adjusted to provide a pulp density of about 20 to about 40% by weight solids with the optimum pulp density for a particular case depending on the nature of the feed material and the metals concentration desired in the product solution. Operating factors such as the size and shape of the reaction vessel and the type of agitation provided also will influence the selection of pulp density for any given case.

The pH of the slurry treated in the oxidation step must be adjusted to a level within the range of about 4.5 to about 6.5, preferably between about 5 and about 6. Where the slurry pH is about the desired level initially, as is usually the case where chloride salts have been removed by washing with alkaline solution, it is lowered by addition of sulphuric acid to the slurry and, in the event the slurry pH initially is below the minimum limit, it is adjusted upwardly by addition of any suitable alkali such as sodium hydroxide or ammonium hydroxide for example.

The slurry with pH adjusted as noted above is reacted with free oxygen in an agitator-equipped pressure vessel such as an autoclave. The reaction is conducted at a temperature within the range of from about 80°C. to about 180°C., preferably 120°C. to 150°C. under oxidizing conditions created by feeding oxygen or a free-oxygen bearing gas, such as air, oxygen enriched air or pure oxygen into the slurry under sufficient pressure to maintain an oxygen overpressure above about 5 p.s.i. and preferably between about 20 and about 100 p.s.i. Higher pressures and temperatures can, of course, be employed but the increased cost of the equipment required to withstand the more severe conditions will generally not be justified by an increase in the reaction rate obtained by the more severe conditions. The reaction is exothermic once initiated and thus heat from an external source is required only at the outset of the reaction.

The oxidation reaction is continued until substantially all the nickel, cobalt and/or copper values in the feed material are converted to the form of hydroxides. An oxidation time of 4 hours or longer is usually necessary to accomplish this.

The reactions which are thought to occur during oxidation of nickel and copper bearing intermediates in ammonium sulphate solution are as follows:

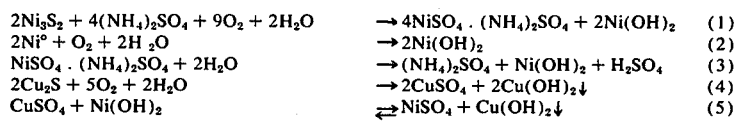

It is believed that at a pH between about 4.5 and about 6.5, rapid oxidation of $Ni_3S_2$ and $Ni°$ to a di-amine sulphate occurs according to equations (1) and (2). The di-amine sulphate then rapidly hydrolizes to $Ni(OH)_2$ at a temperature between about 80°C. and about 180°C. according to equation (3). All $Cu_2S$ in the particles is probably dissolved by direct oxidation into $CuSO_4$ [according to equation (4)] and then converted to insoluble $Cu(OH)_2$ in the presence of $Ni(OH)_2$ according to equation (5).

In the course of the oxidation reaction a viscous slurry is formed which contains nickel, cobalt and/or copper hydroxides and, if present in the starting material, precious metals. On completion of the reaction, the slurry is preferably then cooled to a temperature below about 100°C. and the oxygen pressure is relieved.

Sulphuric acid is then added to the cooled slurry in amount sufficient to decrease the pH to about 3 to 4.5. The acidified slurry is agitated and digested at a temperature below about 100°C. until dissolution of the nickel, cobalt and/or copper values is complete. Undissolved residue which contains substantially all the precious metals present in the starting material and any unoxidized non-ferrous metal values plus incidental impurities is separated from the solution by conventional liquid-solids separation procedures and may be treated by conventional means for recovery of the precious metals therefrom.

The leach solution, after treatment in suitable purification steps may be treated for recovery of nickel, cobalt and/or copper values by known methods.

The following examples further illustrate the operation of the process of the invention:

EXAMPLE 1

The starting material for this example was a dried nickel anode scrap sludge produced as a by-product during electro-refining of nickel sulphide anodes in accordance with the process described by Boldt and Queneau, *The Winning of Nickel*, Longmans Canada Limited, 1967, pp 364–68. This material was ground to a maximum particle size of about 45 microns and was then washed in a warm solution of water and caustic soda having a pH of 9 to remove the chloride values. About 930 grams of washed material were slurried in about 6.5 liters of ammonium sulphate solution containing 57 g.p.l. ammonium sulphate. The pH of the slurry, which initially was about 9 was adjusted to about 5.8 by addition of $H_2SO_4$. The pH-adjusted slurry was reacted in a closed agitator-equipped reaction vessel at a temperature of 250°F. and under an overpressure of oxygen of 20 p.s.i.g. for 4 hours. At the end of this reaction period, the slurry was cooled, the oxygen overpressure removed and sulphuric acid was added to adjust the pH to 3.5. The acidified slurry was agitated for 15 minutes after which the solution was separated from the residue. The analysis of the feed material and the final solution and the non-ferrous metal extractions and precious metals recoveries are shown in Table I.

EXAMPLE 2

This example illustrates the effect of ammonium sulphate concentration on the nickel and copper extractions. The starting material was produced in the same manner as that in Example 1 and analyzed (% by wt.): Ni - 55.4, Co - 0.238, cu - 8.02, Fe - 0.43, $S_{(Total)}$ - 24.1, Cl - 0.77. The material was treated for Cl$^-$ removal in the same way as described in Example 1. The washed particles were then dispersed in 6.5 liters of water to form a slurry. The pH of the slurry was adjusted to 6 and the adjusted slurry was divided into 150 ml samples, each of which was reacted at 250°F. under an oxygen partial pressure of 20 p.s.i. at different levels of ammonium sulphate concentration. At the completion of each reaction, the resulting slurry samples were combined with sufficient sulphuric acid to decrease the pH to 3.0. An analysis of the nickel and copper content of the resulting solution was made and from the analysis the proportion of nickel and copper extracted from the material treated was determined. The results are tabulated in Tables II and III below:

TABLE II

| Ammonium Sulphate Conc. (gpl) | Nickel and Copper Analyses of Liquor at Various Reaction Times (g.p.l.) | | | | | | | |
|---|---|---|---|---|---|---|---|---|
| | 0.5 Hour | | 1.0 Hour | | 2.0 Hours | | 4 Hours | |
| | Ni | Cu | Ni | Cu | Ni | Cu | Ni | Cu |
| 0 | 15.0 | 0.36 | 23.0 | 0.94 | 38.0 | 1.36 | 58.0 | 2.3 |
| 10 | 22.0 | 0.50 | 33.0 | 1.0 | 52.0 | 1.1 | 71.0 | 4.6 |
| 50 | 34.0 | 1.0 | 51.0 | 2.0 | 69.5 | 3.0 | 78.0 | 7.9 |
| 100 | 34.5 | 0.25 | 46.5 | 3.0 | 64.0 | 3.6 | 78.5 | 11.1 |
| 300 | 47.0 | 6.5 | 64.0 | 7.1 | 76.5 | 10.3 | 79.5 | 10.5 |

TABLE III

| Ammonium Sulphate Conc. (gpl) | % Metals Extraction at Various Reaction Times (Based on Liquor Analysis) | | | | | | | |
|---|---|---|---|---|---|---|---|---|
| | 0.5 Hour | | 1.0 Hour | | 2.0 Hours | | 4 Hours | |
| | Ni | Cu | Ni | Cu | Ni | Cu | Ni | Cu |
| 0 | 19.0 | 3.1 | 28.4 | 8.0 | 45.9 | 11.3 | 68.3 | 18.7 |
| 10 | 27.8 | 4.4 | 40.8 | 8.5 | 62.8 | 9.2 | 83.6 | 37.5 |
| 50 | 43.0 | 8.9 | 63.0 | 17.1 | 83.9 | 25.0 | 91.9 | 64.5 |
| 100 | 46.2 | 2.2 | 57.5 | 25.6 | 77.3 | 30.0 | 92.5 | 90.4 |
| 300 | 59.5 | 56.9 | 79.1 | 60.7 | 92.3 | 85.9 | 93.6 | 85.5 |

The data in Table III shows that ammonium sulphate concentration has a pronounced affect on nickel and copper extractions. With zero ammonium sulphate concentration, only 68.3% and 18.7% of the nickel and copper respectively were extracted with 4 hours pressure oxidation. With 100 g.p.l. ammonium sulphate, 91.9% of the nickel and 90.4% of the copper was extracted with 4 hours reaction time.

TABLE I

| | % | | | | oz/T | |
|---|---|---|---|---|---|---|
| | Ni | Co | Cu | S | Pt | Pd |
| Feed (927 gms) | 59.1 | 0.245 | 8.01 | 26 | 0.27 | 1.06 |
| Leach Residue (32.4 gms) | 28.2 | 0.55 | 21.9 | 19.3 | 7.5 | 35 |
| Leach Solution (gpl) | 77 | 0.37 | 10.0 | — | — | — |
| Non-ferrous metals extractions and precious metals recoveries % | 98.3 | 93.0 | 91.0 | — | 99 | 99 |

EXAMPLE 3

This example illustrates the use of $Na_2SO_4$ and $NiSO_4$ as the sulphate salts. The material treated was a matte residue analyzing: Ni - 64.1 wt. %, Co - 0.2 wt. %, Cu - 4.45 wt. %, sulphur 24.8 wt. %, Pt - 0.17 oz/T, Pd - 0.83 oz/T. Two samples of this material were treated in essentially the same way as described in Example 1 except that in one case the sulphate salt was $Na_2SO_4$ and in the second case the sulphate salt was $NiSO_4$. The results and other relevant data are shown in Table IV.

TABLE IV

| | Sample 1 | Sample 2 |
|---|---|---|
| Feed (gms) | 620 | 620 |
| Sulphate salt | $Na_2SO_4$ | $NiSO_4$ |
| Concentration of Sulphate salt (gpl) | 107 | 26 |
| Mol Ratio $S_{Total}$ of Fee Metals | 0.677 | 0.677 |
| Oxidation Time (hrs.) | 6 | 6 |
| Nickel Extraction (%) | 92.2 | 90.0 |
| Copper Extraction (%) | 52.0 | 50.0 |
| Palladium Recovery (%) | 73 | 78.5 |
| Platinum Recovery (%) | 99 | 80.0 |

The above noted results show that while $Na_2SO_4$ and $NiSO_4$ are not as effective as $(NH_4)_2SO_4$ in promoting extraction of nickel and copper, these salts nonetheless substantially enhance extractions over those obtained without a sulphate salt addition.

What we claim as new and desire to protect by Letters Patent of the United States is:

1. A method of treating metal bearing intermediate materials which contain (a) one or more metals selected from the group consisting of nickel, cobalt and copper, (b) sulphide sulphur in an amount less than that required to combine stoichiometrically with said metals as sulphates and, optionally, (c) one or more precious metals selected from the group consisting of palladium, platinum, silver and gold, said method comprising the steps of: forming a slurry of finely divided particles of said materials in a substantially ammonia-free aqueous solution containing from about 25 to about 300 grams per liter of at least one sulphate salt selected from the group consisting of ammonium sulphate, sodium sulphate and nickel sulphate; adjusting the pH of said slurry to a level within the range of 4.5 – 6.5 and reacting said adjusted slurry at a temperature within the range of about 80° to about 180°C. under a positive partial pressure of oxygen with a free oxygen-containing gas; continuing said reaction to convert said group (a) metals to hydroxides; cooling the thus-reacted slurry to below about 100°C. and reducing the pressure to atmospheric; adding sulphuric acid to said cooled slurry in an amount sufficient to decrease the pH thereof to a value within the range of about 3 to about 4.5 and agitating said acid-treated slurry to dissolve said group (a) metal hydroxides in the solution, and separating solution containing dissolved group (a) metals from said acid-treated slurry.

2. The process according to claim 1 wherein the sulphate salt concentration of the aqueous slurrying solution is about 50 to about 100 g.p.l.

3. The process according to claim 1 wherein the sulphate salt is ammonium sulphate.

4. The process according to claim 1, wherein the slurry is reacted at an oxygen overpressure between about 20 and about 100 p.s.i. and at a temperature between about 120°C. and about 150°C.

5. The process according to claim 1, wherein said materials contain at least one group (c) metal and said metal is recovered in concentrated form with the undissolved residue from the group (a) metal hydroxides dissolution step.

* * * * *